W. SHRIVER.
Copying Press.
No. 123,584. Patented Feb. 13, 1872.
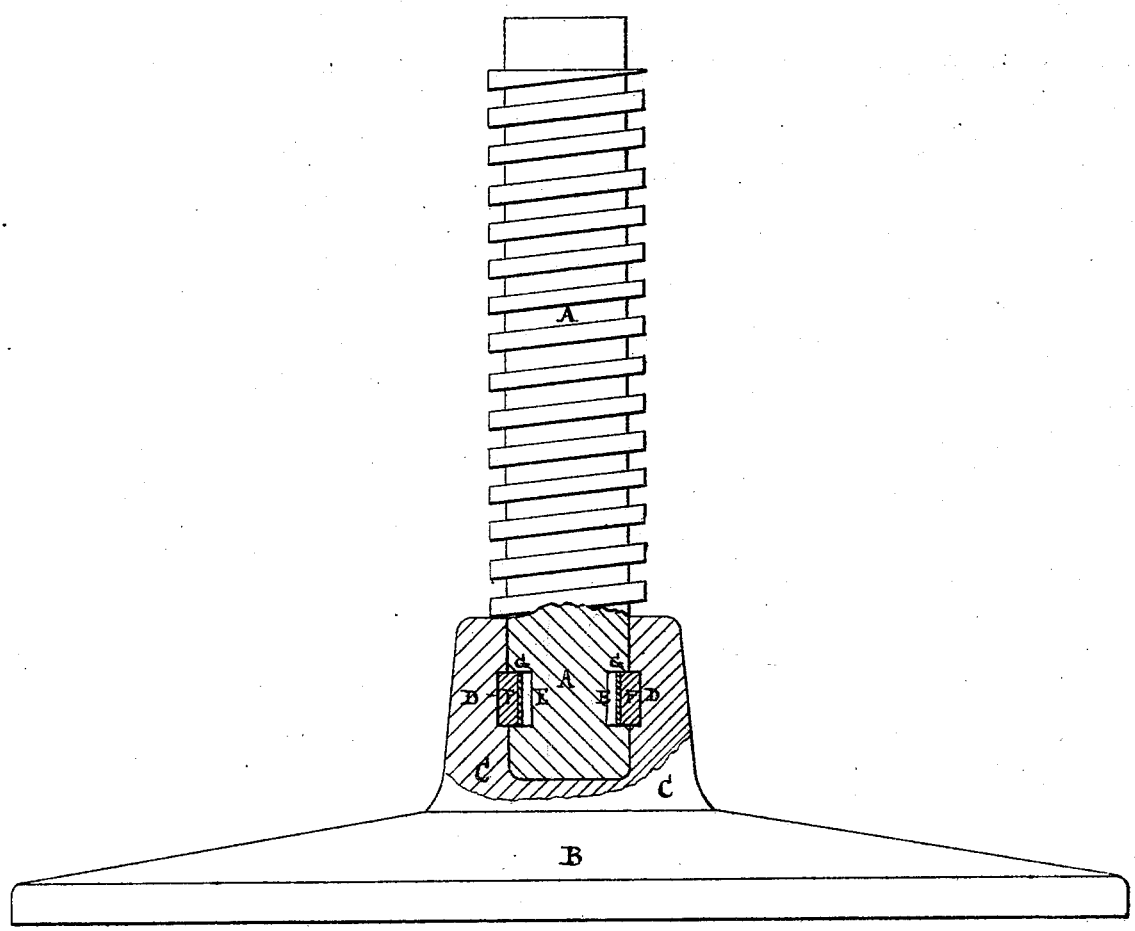
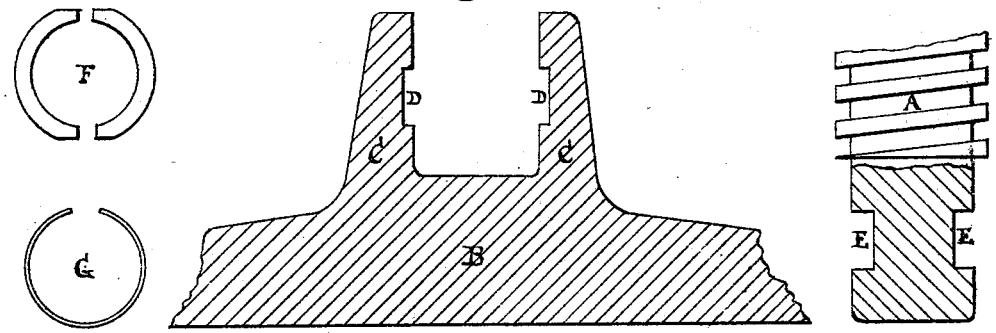
Witnesses. Inventor.
Frederick A Coyle
John Deckelman Jr. Walter Shriver 123,584

UNITED STATES PATENT OFFICE.

WALTER SHRIVER, OF NEW YORK, N. Y.

IMPROVEMENT IN COPYING-PRESSES.

Specification forming part of Letters Patent No. 123,584, dated February 13, 1872; antedated February 3, 1872.

SPECIFICATION.

I, WALTER SHRIVER, of New York City, State of New York, have invented an Improvement in the Manufacture of Copying-Presses, of which the following is a specification, reference being had to the accompanying drawing, of which—

Figure 1 represents the screw and platen, connected; Fig. 2, details of the same, like parts in both being referred to by the same letters.

A represents the screw; B, the platen of the press; and C the socket. The platen B is cast with the socket C attached; the socket is bored out and a recess, D, is formed in it, as shown in Fig. 2. Into the socket C the end of the screw A is fitted, having in it a groove, E, twice the depth of the recess in the socket C, which groove, when the screw is in its place in the socket, comes exactly opposite the recess D in the socket. When the screw and platen are to be connected a ring, F, in halves, (Fig. 2,) with a spring, G, behind it, is placed in the groove E in the screw and compressed into it. The end of the screw is inserted into the hole in the socket C, pressed down, and when the ring F comes opposite the recess D in the socket the spring G forces the ring out into the recess. The ring F, being of a width equal to twice the depth of the recess D, fills the recess, and also projects half its width into the groove E in the screw, thus forming a permanent and durable connection between the screw and the platen.

A ring, in itself a spring, may be substituted for the divided ring F and the spring G, but the connection is preferably made as above described.

What I claim as my invention is—

The method of connecting the screw and platen, as described.

WALTER SHRIVER.

Witnesses:
   FREDERICK A. COYLE,
   JOHN DECKELMAN, Jr.